United States Patent
Paxton et al.

(10) Patent No.: US 10,023,218 B2
(45) Date of Patent: Jul. 17, 2018

(54) CARRIER MOUNTING (71) Applicant: Silver Cross (IP) Limited, Skipton (GB)

(72) Inventors: Nicholas J. Paxton, Barnoldswick (GB); Philip Taylor, Skipton (GB)

(73) Assignee: Silver Cross (IP) Limited, Skipton, North (GB)

( * ) Notice: Subject to any disclaimer, the term of this patent is extended or adjusted under 35 U.S.C. 154(b) by 0 days.

(21) Appl. No.: 15/520,298

(22) PCT Filed: Nov. 13, 2015

(86) PCT No.: PCT/GB2015/053450
§ 371 (c)(1),
(2) Date: Apr. 19, 2017

(87) PCT Pub. No.: WO2016/075479
PCT Pub. Date: May 19, 2016

(65) Prior Publication Data
US 2017/0334476 A1 Nov. 23, 2017

(30) Foreign Application Priority Data
Nov. 14, 2014 (GB) .................................. 1420312.9

(51) Int. Cl.
B62B 7/14 (2006.01)
A47D 13/02 (2006.01)
(Continued)

(52) U.S. Cl.
CPC .............. *B62B 7/142* (2013.01); *A47D 1/006* (2013.01); *A47D 1/06* (2013.01); *A47D 13/025* (2013.01); *B62B 7/145* (2013.01)

(58) Field of Classification Search
CPC ........... B62B 7/14; B62B 7/142; B62B 7/147; B62B 9/12
(Continued)

(56) References Cited

U.S. PATENT DOCUMENTS

| 5,201,535 A | * | 4/1993 | Kato | ...................... B62B 7/123 |
| | | | | 280/30 |
| 5,865,447 A | * | 2/1999 | Huang | ..................... B62B 7/142 |
| | | | | 280/30 |

(Continued)

FOREIGN PATENT DOCUMENTS

| CN | 103 072 612 A | 5/2013 |
| CN | 203 111 248 U | 8/2013 |

(Continued)

OTHER PUBLICATIONS

Great Britain Application No. 1420312.9 Search Report dated Feb. 11, 2015.

*Primary Examiner* — Jeffrey J Restifo
(74) *Attorney, Agent, or Firm* — Woodard, Emhardt, Moriarty, McNett & Henry, LLP; Charles Meyer (57) ABSTRACT

A carrier mounting (3*a*, 3*b*) for supporting an infant carrier on a pushchair chassis, the mounting comprising a socket member having a first socket (17) and a second socket (19) therein, both sockets being configured to receive a correspondingly shaped mounting strut of an infant carrier. The socket member is pivotable between first and second positions such that when the carrier mounting is connected to a pushchair chassis, the first or second socket (17, 19) respectively is locatable in a receiving position in which a longitudinal axis of the respective socket bore is oriented with respect to the pushchair chassis at an angle suitable for receiving a mounting strut of an infant carrier. When the second socket (19) is in its receiving position, said second socket (19) supports the infant carrier at a higher point on the (Continued)

pushchair chassis than the first socket (17). The carrier mounting further comprises a locking mechanism (23) configured to releasably hold the socket member in each of the first and second positions, and to allow pivoting therebetween.

19 Claims, 9 Drawing Sheets

(51) Int. Cl.
*A47D 1/06* (2006.01)
*A47D 1/00* (2006.01)

(58) Field of Classification Search
USPC .............................. 280/47.38, 47.39, 47.41
See application file for complete search history.

(56) References Cited

U.S. PATENT DOCUMENTS

| | | | | |
|---|---|---|---|---|
| 6,099,022 A * | 8/2000 | Pring | ...................... | B62B 7/147 280/47.38 |
| 6,286,844 B1 * | 9/2001 | Cone, II | ................... | B62B 9/28 280/47.41 |
| 6,446,990 B1 * | 9/2002 | Nania | ..................... | B62B 7/145 280/47.371 |
| 6,513,827 B1 * | 2/2003 | Barenbrug | ............. | B62B 7/145 280/643 |
| 7,017,921 B2 * | 3/2006 | Eros | ......................... | B62B 9/28 280/47.38 |
| 7,032,922 B1 * | 4/2006 | Lan | .......................... | B62B 7/08 280/643 |
| 7,267,359 B1 * | 9/2007 | Yang | ....................... | B62B 7/08 280/47.34 |
| 7,377,537 B2 * | 5/2008 | Li | ............................ | B62B 7/123 280/47.38 |
| 7,475,900 B2 * | 1/2009 | Cheng | ...................... | B62B 7/08 280/47.38 |
| 7,658,399 B2 * | 2/2010 | Van Dijk | ................ | B62B 7/142 280/30 |
| 7,681,894 B2 * | 3/2010 | Santamaria | ............ | B62B 7/142 24/589.1 |
| 7,798,500 B2 * | 9/2010 | Den Boer | ................ | B62B 7/062 280/47.34 |
| 7,938,435 B2 * | 5/2011 | Sousa | ..................... | B62B 7/142 280/47.4 |
| 8,033,555 B2 * | 10/2011 | Mostert | ................ | B60N 2/2848 280/47.38 |
| 8,251,382 B2 * | 8/2012 | Chen | ....................... | B62B 7/142 280/47.38 |
| 8,276,985 B2 * | 10/2012 | Kho | ........................ | A47D 1/10 280/47.38 |
| 8,641,077 B2 * | 2/2014 | Conrad | .................. | B62B 7/008 280/47.38 |
| 8,651,502 B2 * | 2/2014 | Winterhalter | ........ | B60N 2/2848 280/47.4 |
| 8,657,326 B2 * | 2/2014 | Shaanan | ................. | B62B 7/142 280/47.38 |
| 8,727,370 B2 * | 5/2014 | Tsai | ....................... | B62B 7/064 280/47.4 |
| 8,851,505 B2 * | 10/2014 | Van Gelderen | ........ | B62B 7/145 280/657 |
| 8,876,208 B2 * | 11/2014 | Heisey | ................. | B60N 2/2827 297/130 |
| 8,955,869 B2 * | 2/2015 | Zehfuss | .................. | B62B 7/008 280/642 |
| 9,010,773 B2 * | 4/2015 | Horst | ...................... | B62B 7/008 280/47.38 |
| 9,108,654 B2 * | 8/2015 | Kozinski | .................. | B62B 7/08 |
| 9,108,659 B2 * | 8/2015 | Sparling | .................. | B62B 9/12 |
| 9,119,483 B1 * | 9/2015 | Heisey | ................. | A47D 15/006 |
| 9,200,746 B2 * | 12/2015 | Xiao | ..................... | A47D 1/006 |
| 9,227,650 B2 * | 1/2016 | Gillett | ...................... | B62B 7/12 |
| 9,242,585 B2 * | 1/2016 | Kozinski | .............. | B60N 2/2848 |
| 9,517,789 B2 * | 12/2016 | Pacella | .................. | B62B 7/145 |
| 9,545,940 B2 * | 1/2017 | Taylor | .................... | B62B 7/142 |
| 9,610,966 B2 * | 4/2017 | Zhong | ................... | B62B 7/142 |
| 9,637,153 B2 * | 5/2017 | Sclare | .................. | B62B 5/0016 |
| 9,840,168 B2 * | 12/2017 | Yi | ............................. | B60N 2/28 |
| 9,884,640 B2 * | 2/2018 | Li | .............................. | B62B 7/08 |
| 2006/0290107 A1 | 12/2006 | Powers | | |
| 2010/0013281 A1 | 1/2010 | Chen et al. | | |
| 2013/0257002 A1 * | 10/2013 | Horst | ..................... | B62B 7/008 280/47.38 |

FOREIGN PATENT DOCUMENTS

| | | |
|---|---|---|
| CN | 203 111 265 U | 8/2013 |
| CN | 203 228 817 U | 10/2013 |
| CN | 203 739 947 U | 7/2014 |
| EP | 1 826 094 A1 | 8/2007 |
| GB | 2 268 394 A | 1/1994 |
| GB | 2 422 810 A | 8/2006 |

* cited by examiner

CARRIER MOUNTING

The present invention relates to mountings for supporting an infant carrier on a pushchair chassis. The invention relates, more particularly, to mountings suitable for enabling reversible conversion of a single carrier pushchair capable of transporting one infant, to a double carrier pushchair capable of transporting two infants in a single "in-line" pushchair chassis.

Pushchairs are used to transport infants, who occupy the pushchair in a carrier. Such pushchairs are typically configured to enable releasable attachment of the carrier to enable multiple different carrier types (such as car seats, carrycots, etc.) to be used interchangeably.

It is desirable for pushchairs to be reversibly convertible between a single carrier pushchair capable of transporting one infant to a double carrier pushchair capable of transporting two infants. Such functionality clearly provides more flexibility in use for the pushchair, since an additional pushchair is not required in the event that transport of a second infant is required. Such double carrier pushchairs can adopt a side-by-side arrangement of the infant carriers, or alternatively the infant carriers can be arranged in an "in-line" manner.

By "in-line" it is meant that the two carriers are arranged relative to one another such that one carrier is provided above and offset from the other carrier, with both carriers being centrally aligned with one another with respect to a plane of symmetry of the pushchair chassis.

However, such conversion generally requires additional connectors and spacers to be attached at various points on the pushchair chassis. In particular, and with specific reference to in-line pushchairs, in order to accommodate an additional infant seat it is generally necessary to raise the height of the existing carrier using spacers so as to make room for the additional carrier beneath. Additionally, connectors must be provided low down on the chassis to provide supports for the additional carrier to be added.

It is an object of the present invention to obviate or mitigate the abovementioned disadvantages.

According to a first aspect of the present invention there is provided a carrier mounting for supporting an infant carrier on a pushchair chassis, the mounting comprising a socket member having a first socket and a second socket therein, both sockets being configured to independently receive a correspondingly shaped mounting strut of an infant carrier,
  wherein said socket member is pivotable between first and second positions such that when the carrier mounting is connected to a pushchair chassis, the first or second socket respectively is locatable in a receiving position in which a longitudinal axis of the respective socket bore is oriented with respect to the pushchair chassis at an angle suitable for receiving a mounting strut of an infant carrier,
  wherein when the second socket is in its receiving position, said second socket is vertically elevated with respect to the pushchair chassis as compared to the first socket in its receiving position, such that said second socket supports the infant carrier at a higher point on the pushchair chassis than the first socket, and
  wherein the carrier mounting further comprises a locking mechanism configured to releasably hold the socket member in each of the first and second positions, and to allow pivoting therebetween.

The carrier mounting of the present invention is able to be pivoted between said first and second positions to alter the vertical elevation of the sockets in the socket member with respect to the pushchair chassis. When connected to a chassis of a pushchair, the carrier mounting is thereby able to adjust the vertical elevation of an infant carrier supported on the pushchair simply by pivoting the carrier mounting. The ability to alter the vertical elevation in this way means that the configuration of the pushchair can be adjusted to provide room for an additional infant carrier to be located on the pushchair without requiring further spacer pieces.

The carrier mounting of the present invention provides a convenient solution to the aforementioned disadvantages with prior art systems for enabling a pushchair to be converted between single and double modes. In particular, it will be appreciated that there is no need to utilise an additional spacer piece in order to provide space for an additional (lower) carrier on the pushchair, as is required with prior art pushchairs. Clearly such a solution reduces the complexity of single-to-double convertible pushchairs.

Alternatively or additionally, it will be appreciated that the aforementioned movement between first and second positions can be used simply to adjust (i.e. raise or lower) the height of a single infant carrier. This might be useful, for example, to enable flexible accommodation of infant carriers of different sizes.

For the avoidance of doubt, the term "infant carrier" is intended to cover any apparatus suitable for transporting an infant and which has suitable mounting struts that can be received in the sockets of the carrier mounting of the present invention and includes, in particular, pushchair seats, car seats, carry cots and the like.

The angle of the respective socket bore may extend substantially vertically upwards with respect to the pushchair chassis when the respective socket is in the receiving position. Such a configuration provides for quick and easy attachment and detachment of an infant carrier.

The bores of the first and second sockets may meet inside the socket member to define a common cavity.

The socket member may be pivotable about an angle of about 135° or about 180° to effect movement between said first and second positions. The pivot angle may be selected based on the configuration of the pushchair chassis to which the carrier mounting is to be connected.

According to a second aspect of the present invention there is provided a pushchair chassis comprising two carrier mountings according to the first aspect of the present invention.

The pushchair chassis may comprise additional carrier mountings for receiving an additional infant carrier thereon. By this, it is intended to mean that the pushchair chassis is configured to receive the additional infant carrier at the same time as the other carrier.

In embodiments where the pushchair chassis comprises additional carrier mountings for receiving an additional infant carrier, the pushchair chassis may be configured to receive the infant carriers in an in-line fashion. The pushchair chassis may, for example, comprise a frame, with the carrier mountings of the first aspect of the present invention being provided on the frame and the additional carrier mountings being provided either below or above the carrier mountings of the first aspect of the present invention. In the embodiment where the additional carrier mountings are provided below the carrier mountings of the first aspect of the invention, pivoting the carrier mounting of the first aspect of the present invention between first and second positions may provide additional room for the additional carrier to be provided beneath. Similarly, in the embodiment where the additional carrier mountings are provided above the carrier mountings of the first aspect of the invention, pivoting the carrier mounting of the first aspect of the present invention between second and first positions may provide additional room for the additional carrier to be provided above.

By "in-line" it is meant that the carrier and the additional carrier are arranged relative to one another such that one carrier is provided substantially above and offset from the other carrier, with both carriers being substantially centrally aligned with one another with respect to a plane of symmetry of the pushchair chassis.

According to a third aspect of the present invention there is provided a pushchair comprising two carrier mountings according to the first aspect of the present invention, and at least one infant carrier. The pushchair may comprise additional carrier mountings for receiving an additional infant carrier thereon. The pushchair may comprise two infant carriers. In embodiments where the pushchair comprises two infant carriers, the infant carriers may be arranged in an in-line fashion. The pushchair may, for example, comprise a frame, with the carrier mountings of the first aspect of the present invention being provided on the frame and the additional carrier mountings being provided below or above the carrier mountings of the first aspect of the present invention. In the embodiment where the additional carrier mountings are provided below the carrier mountings of the first aspect of the invention, pivoting the carrier mounting of the first aspect of the present invention between first and second positions may provide additional room for the additional carrier to be provided beneath. Similarly, in the embodiment where the additional carrier mountings are provided above the carrier mountings of the first aspect of the invention, pivoting the carrier mounting of the first aspect of the present invention between second and first positions may provide additional room for the additional carrier to be provided above.

By "in-line" it is meant that the two carriers are arranged relative to one another such that one carrier is provided substantially above and offset from the other carrier, with both carriers being substantially centrally aligned with one another with respect to a plane of symmetry of the pushchair.

For a better understanding, the present invention will now be more particularly described, by way of non-limiting example only, with reference to and as shown in the accompany schematic drawings (not necessarily to scale) in which.

Figure 1:
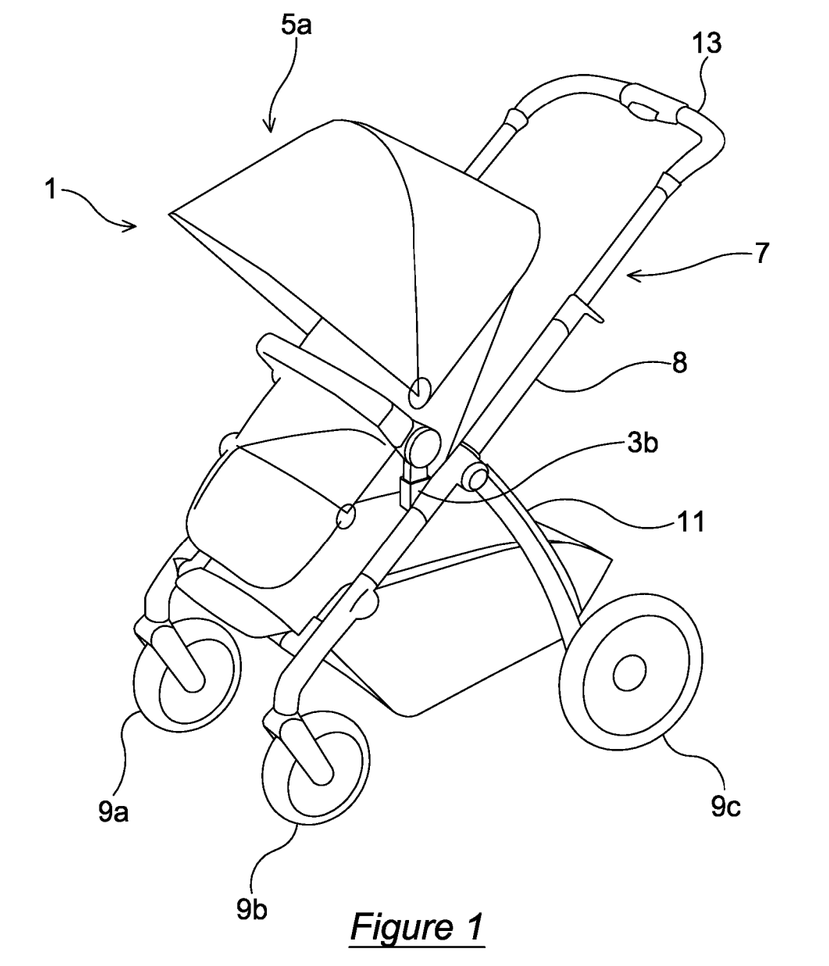
FIG. 1 is a schematic perspective view of a pushchair incorporating an embodiment of a carrier mounting of the present invention, the pushchair being in single mode.
Figure 2:
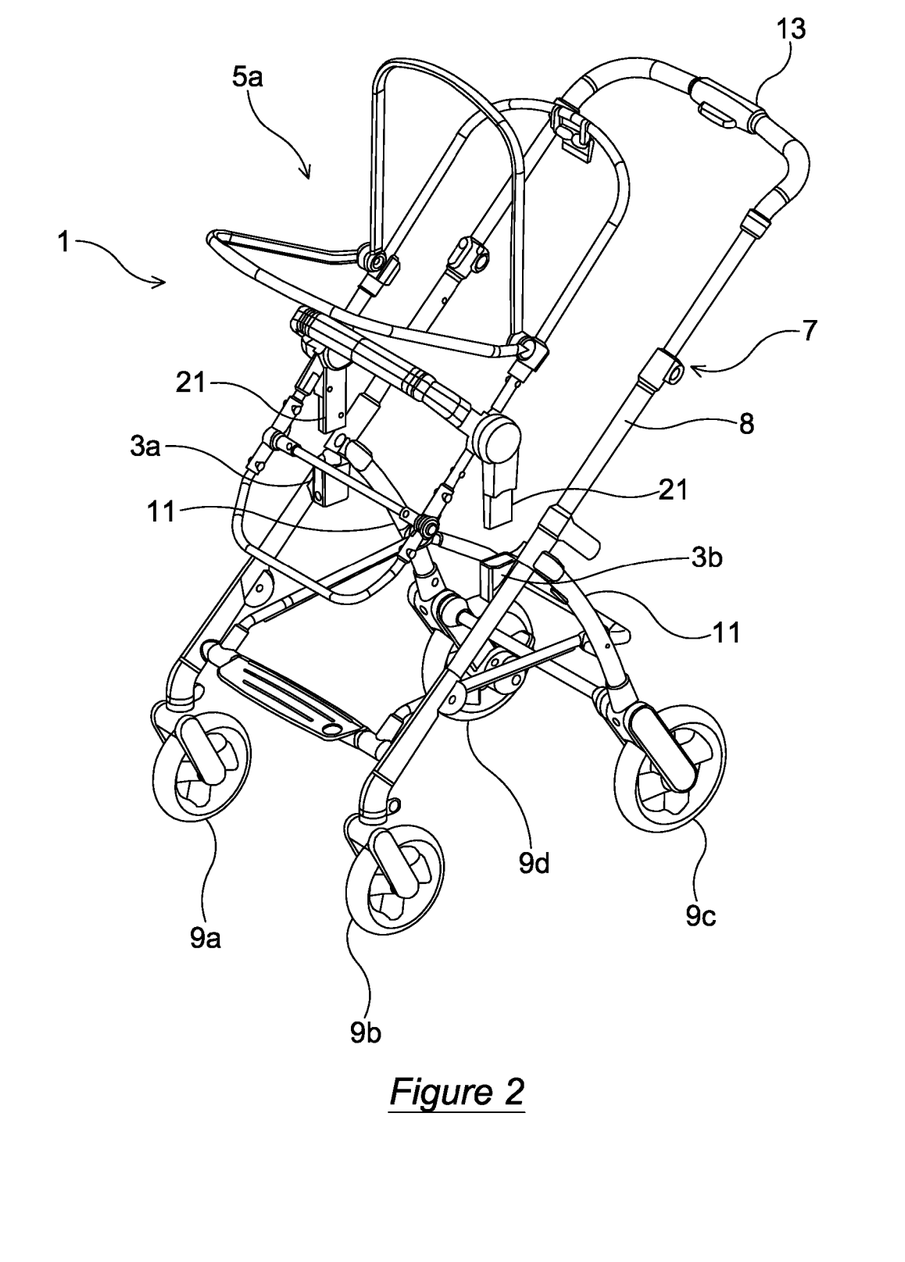
FIG. 2 is a graphic perspective view of the pushchair shown in FIG. 1 in which the carrier is shown separated from the pushchair chassis.

FIGS. 1 and 2 show a pushchair 1 incorporating two carrier mountings 3a, 3b (collectively "3", only 3b being visible in FIG. 1) in accordance with the present invention. The pushchair 1 is in a "single mode" in which only a single infant carrier in the form of a seat 5a (such as a car seat, carrycot, etc.) is mounted on the pushchair chassis 7. The pushchair 1 can be converted between "single" and "double" modes (shown in FIGS. 1 and 7 respectively), as explained more fully below, to respectively enable one or two infant carriers 5a, 5b (collectively "5") to be releasably mounted thereon, thereby enabling one or two infants to be transported in the pushchair 1.

The pushchair chassis 7 is made up of a frame 8 connected to four wheels 9a, 9b, 9c, 9d (collectively "9", wheel 9d not being visible in FIG. 1) to enable movement along the floor. The frame 8 comprises an inclined generally rectangular portion having two wheels 9a, 9b mounted at its lower front end. The frame 8 further comprises two further frame portions 11 depending downwardly from approximately mid-way up the inclined generally rectangular frame 8 and extending towards a back end of the pushchair 1, each downwardly depending portion 11 having a wheel 9c/9d mounted thereto. The frame 8 includes a handle region 13 towards its upper end to enable the pushchair 1 to be steered by an operator thereof.

The frame 8 is provided with a set of two carrier mountings 3 in accordance with the present invention, hereinafter referred to as "primary carrier mountings" 3 below for clarity with the remainder of the description, to enable the seat 5a to be releasably supported on the pushchair chassis 7. The primary carrier mountings 3 are provided approximately mid-way up the inclined rectangular portion of the frame 8 in a similar region to the downwardly depending portions 11 of the frame 8. Only one carrier mounting 3b is visible in FIG. 1, the other being occluded from view by the infant seat 5a. Both carrier mountings 3a, 3b are visible in FIG. 2. The primary carrier mountings 3 can be reconfigured so as to enable an additional infant seat 5b to be accommodated on the pushchair chassis 7, as explained more fully below, such that the pushchair 1 is capable of transporting two infants in the aforementioned "double mode".

FIGS. 3 to 6 show an enlarged view of one of the aforementioned primary carrier mountings 3 in accordance with the present invention. Each primary carrier mounting 3 comprises a plastics socket member 15 having two sockets 17, 19 provided therein, said sockets 17, 19 each being configured to receive a correspondingly shaped strut 21 (see FIG. 2) of an infant seat 5a, 5b to secure it in place on the chassis 7 of the pushchair 1. The sockets 17, 19 each comprise an opening leading to a longitudinal bore extending into the socket member 15. The bores of the sockets 17, 19 meet inside the socket member 15 to define a single cavity within.

Figure 3:
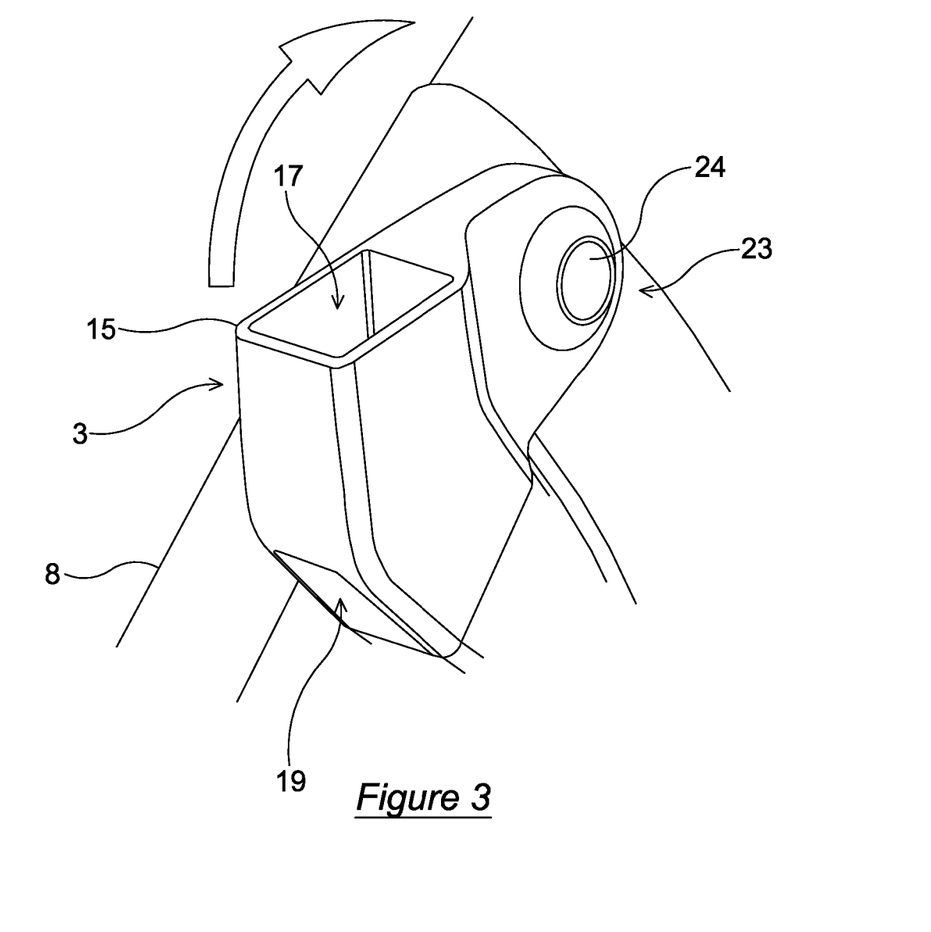
FIG. 3 is an enlarged schematic perspective view of the carrier mounting according to the present invention shown in FIG. 1 as seen from the inside of the pushchair, the mounting being in a first position.
Figure 4:
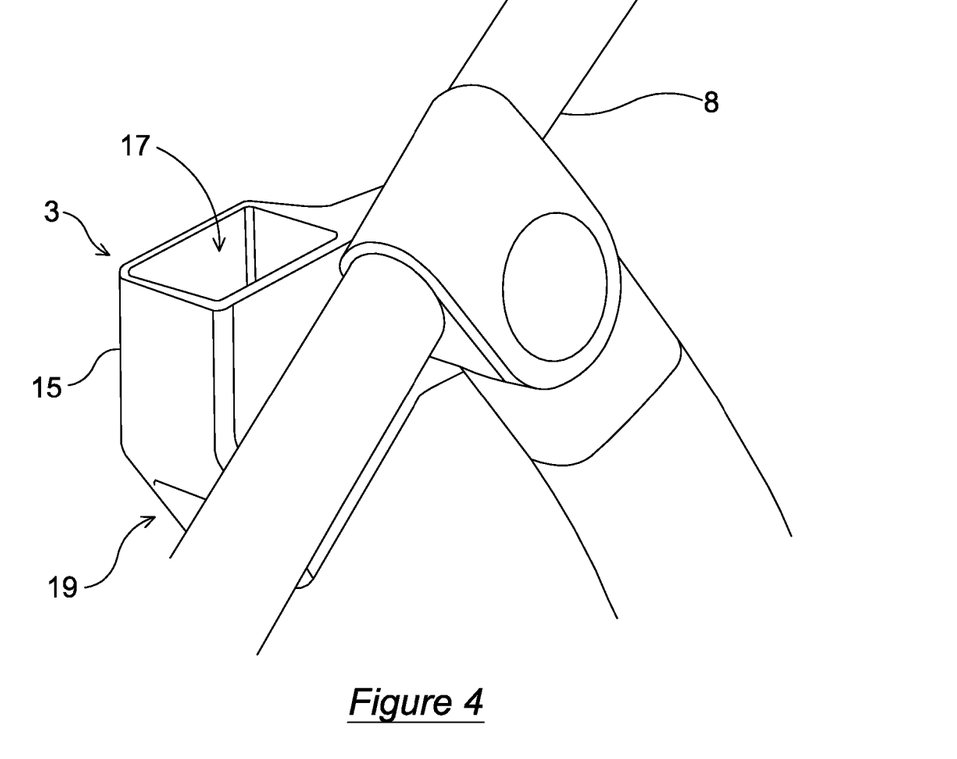
FIG. 4 is a further schematic perspective view of the carrier mounting shown in FIG. 1 as seen from the outside of the pushchair, once again with the mounting being in the first position.
Figure 5:
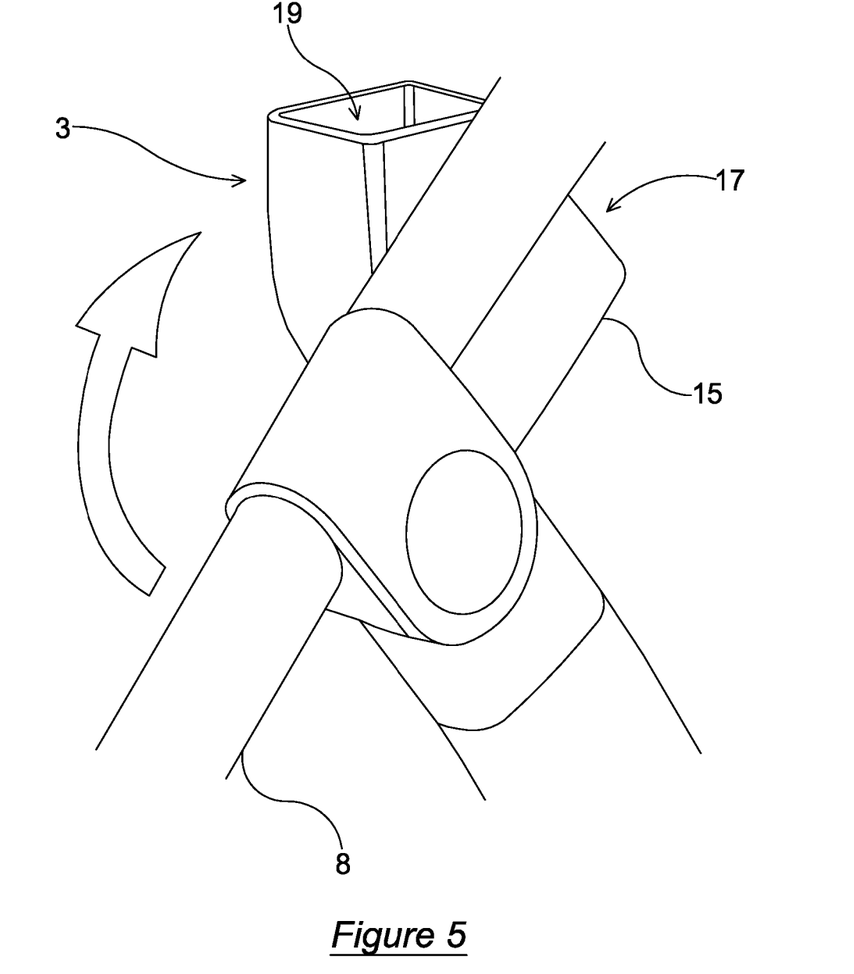
FIG. 5 is a further schematic perspective view of the carrier mounting shown in FIG. 1 as seen from the outside of the pushchair, the mounting being in a second position.
Figure 6:
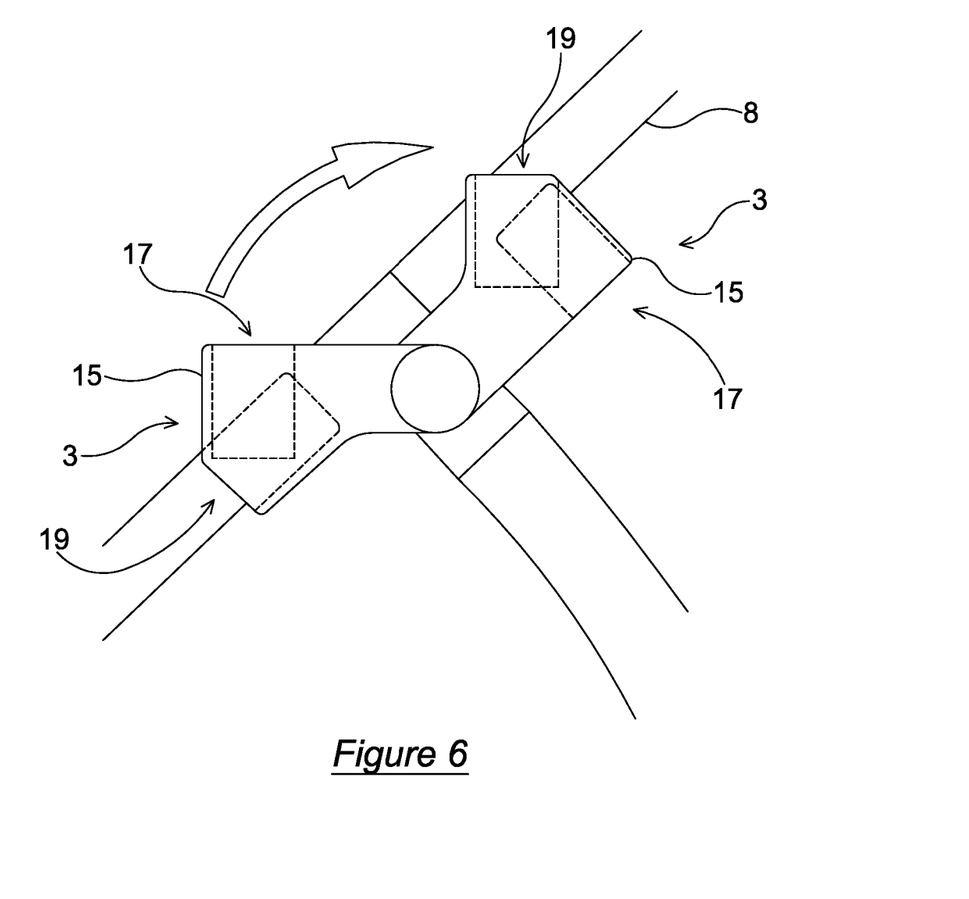
FIG. 6 is a schematic sectional view of the carrier mounting shown in FIG. 1 having both the first and second positions superimposed on one another in phantom.

The socket member 15 is pivotally mounted on the frame 8 of the pushchair 1 and can be pivoted about an angle of approximately 135° to enable positioning of the socket member 15 between first and second positions (shown in FIGS. 3 and 4; and 5 respectively; FIG. 6 showing both positions in phantom). The sockets 17, 19 are disposed on the socket member 15 such that, upon pivotal movement between said first and second positions, the longitudinal axis of the bore of one or the other of the sockets 17, 19 points substantially vertically upwards. In this way, when the strut 21 of the infant seat 5a, 5b is received in the upwardly pointing socket 17, 19, the infant seat 5a, 5b is supported in an upright position.

In the socket member 15 first position as shown in FIGS. 3 and 4, the bore of a first socket 17 is in a receiving position in which the longitudinal axis of the bore points substantially vertically upwards. FIG. 5 shows the socket member 15 in a second position in which a second socket 19 is in the receiving position, once again in which the longitudinal axis of the bore points substantially vertically upwards. As mentioned previously, FIG. 6 shows a superimposed view of the carrier mounting 3 having both the first and second positions shown concurrently in phantom. The direction of pivotal movement is shown in FIGS. 3, 5 and 6.

The primary carrier mounting 3 further comprises a releasable locking mechanism 23 (see FIG. 3) configured to hold the socket member in each of the first and second positions, and to allow pivoting therebetween. A push-button 24 is associated with the locking mechanism 23 to enable release thereof, the button 24 being biased towards an engaged position in which the mechanism 23 is held in place, thereby preventing pivoting movement of the socket member 15. Actuation, e.g. pressing, of the button 24 disengages the locking mechanism 23 to enable pivoting of the carrier mounting 3.

Figure 7:
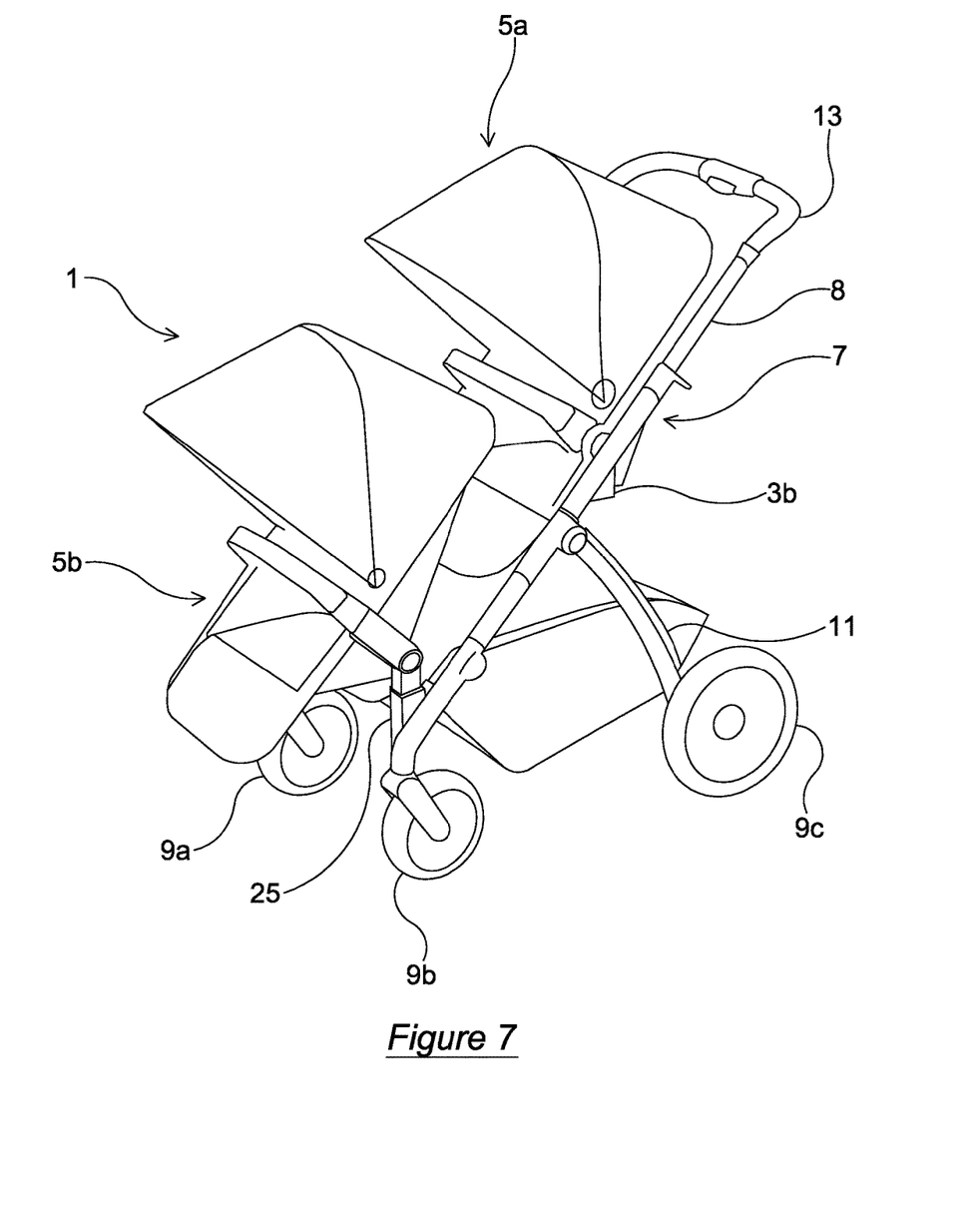
FIG. 7 is a schematic perspective view of a pushchair incorporating the carrier mounting shown in FIG. 1, the pushchair being in double mode.

Once in the second position, the mounting 3 is positioned to accommodate the seat 5a relatively high up on the pushchair chassis 7. This provides room beneath the seat 5a such that an additional seat 5b, e.g. in the form of a further seat, car seat, carrycot, etc. can be accommodated therebeneath, thereby enabling the pushchair 1 to transport two infants in the aforementioned "double mode" as shown in FIG. 7.

As can be seen from the double mode pushchair 1 in FIG. 7, an additional set of two carrier mountings (hereinafter referred to as "secondary mountings") 25 are provided to receive mounting struts (not visible) of the additional seat 5b and thereby to enable such a seat 5b to be releasably supported on the pushchair chassis 7. These are located at the lower end of the rectangular portion of the frame 8 towards the front wheels 9a, 9b. Once again, only one secondary carrier mounting 25 is visible in FIG. 7, the other being occluded from view by the seat 5b.

It will be appreciated that the aforementioned movement between first and second positions can be used in single mode simply to adjust the height of the seat 5a. This might be useful, for example, to enable flexible accommodation of infant seats 5 of different sizes.

Figure 8:
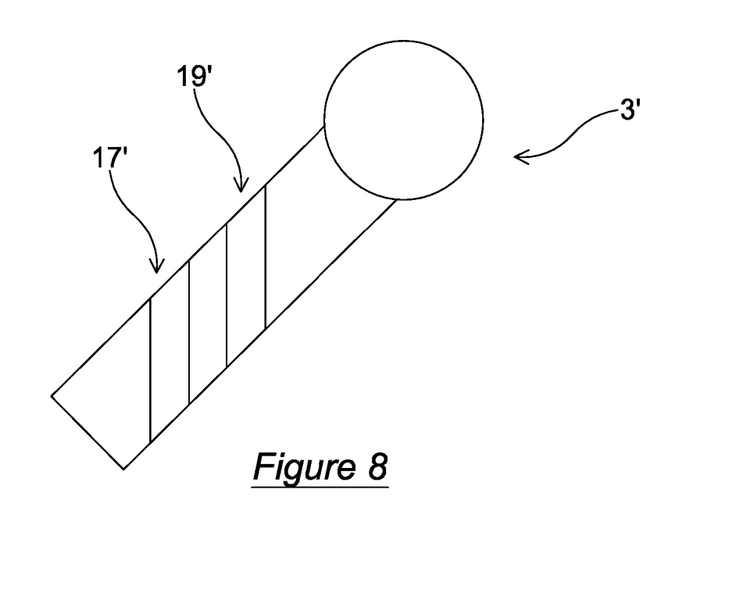
FIG. 8 is a schematic sectional view of a further embodiment of a carrier mounting according to the present invention.
Figure 9:
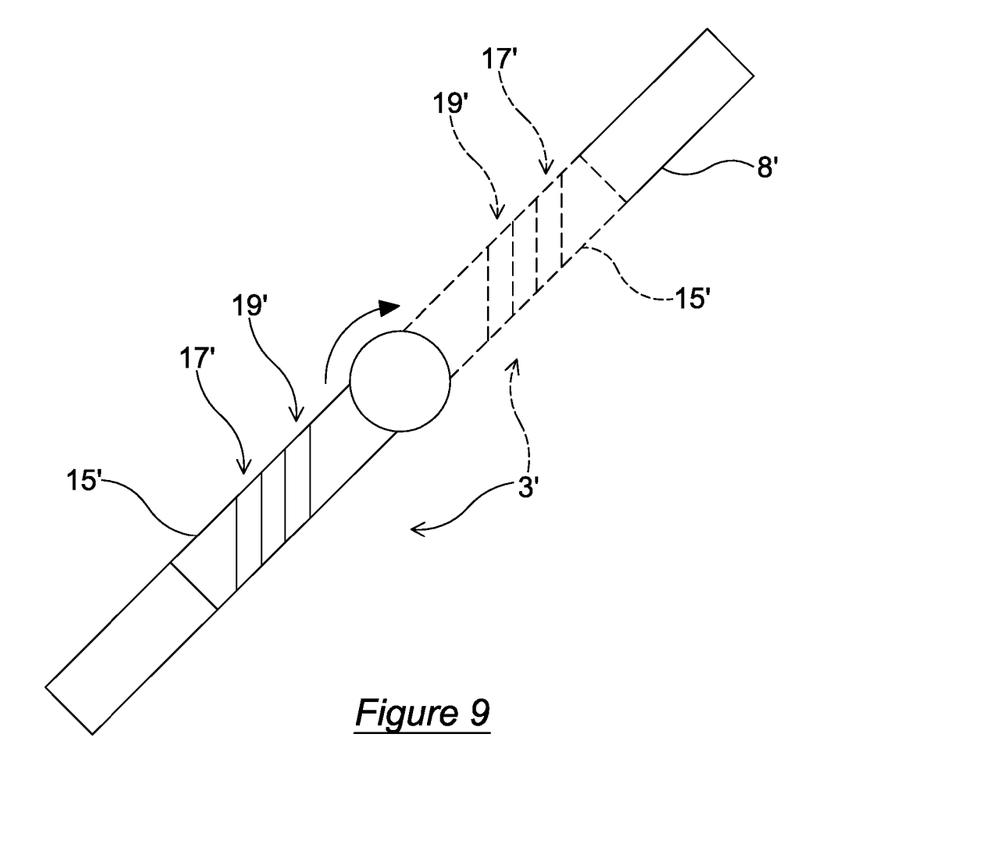
FIG. 9 is a schematic sectional view of a portion of a pushchair chassis incorporating the carrier mounting shown in FIG. 8, showing both the first and second positions superimposed on one another.

FIGS. 8 and 9 show a schematic sectional view of a further embodiment of carrier mounting 3' according to the present invention. The further embodiment of carrier mounting 3' is similar to that shown in FIGS. 1 to 7. In FIGS. 8 and 9 the components corresponding to those described above in relation to FIGS. 1 to 7 take the same reference number but suffixed with a prime symbol (').

In FIG. 9, the carrier mounting 3' is shown in-situ on a portion of a frame 8' of a pushchair chassis (the remainder being cutaway for clarity), with first and second positions of the carrier mountings 3' being shown superimposed on one another.

As with the embodiment of carrier mounting 3 shown in FIGS. 1 to 7 above, the embodiment of carrier mounting 3' shown in FIGS. 8 and 9 comprises a plastics socket member 15' having two sockets 17', 19' provided therein, said sockets 17', 19' each being configured to receive a correspondingly shaped mounting strut of an infant carrier to secure the carrier in place on the pushchair chassis. The sockets 17', 19' each comprise an opening leading to a longitudinal bore extending into the socket member 15'. In contrast to the embodiment of carrier mounting 3 shown in FIGS. 1 to 7 above, the bores of the sockets 17', 19' of the embodiment of carrier mounting 3' shown in FIGS. 8 and 9 do not meet inside the socket member 15' to define a single cavity.

The socket member 15' is pivotally mounted on the frame 8' of the pushchair and can be pivoted as indicated by the arrow about an angle of approximately 180° to enable positioning of the socket member 15' between first and second positions. FIG. 9 shows a superimposed view of the carrier mounting 3' having both the first and second positions shown concurrently, the second position being shown in dashed lines.

The sockets 17', 19' are disposed on the socket member 15' such that, upon pivotal movement between said first and second positions, the longitudinal axis of the bore of both of the sockets 17', 19' points substantially vertically upwards in both positions. In this way, when the strut of the infant carrier is received in either of the upwardly pointing sockets 17', 19', the infant carrier is supported in an upright position.

It will be appreciated that this configuration of carrier mounting 3' provides four height positions in which a seat may be received, namely two in each of said first and second positions as provided by each of the two sockets 17', 19'.

Figure 10:
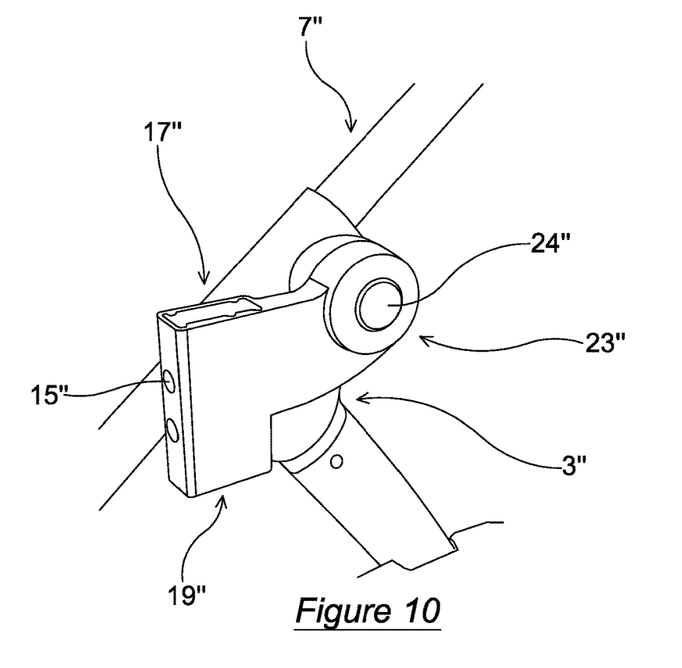
FIG. 10 shows a portion of a pushchair chassis as seen from the inside of the pushchair, the chassis incorporating an embodiment of a carrier mounting according to the present invention, the mounting being in a first position.
Figure 11:
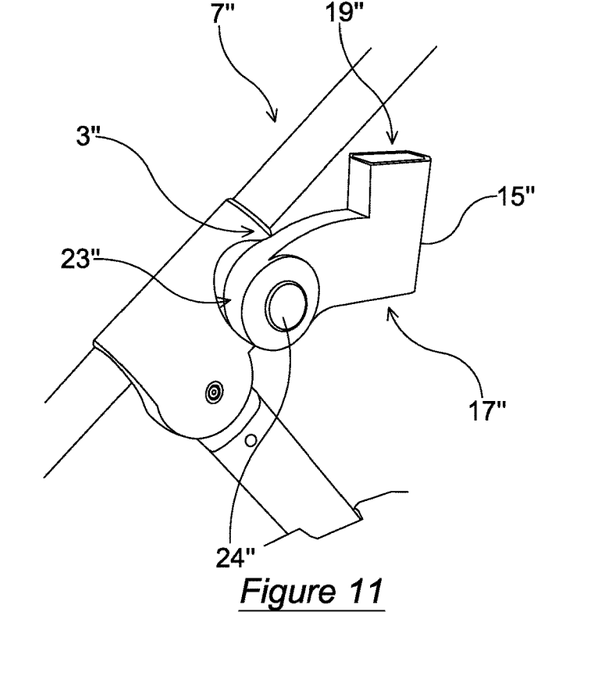
FIG. 11 shows the portion of the pushchair chassis shown in FIG. 10, with the carrier mounting thereof in a second position.

FIGS. 10 and 11 show a portion of a pushchair chassis 7" incorporating an embodiment of carrier mounting 3" in accordance with the present invention. The chassis 7" and further embodiment of carrier mounting 3" are similar to those shown in FIGS. 1 to 7. In FIGS. 10 and 11 the components corresponding to those described above in relation to FIGS. 1 to 7 take the same reference number but suffixed with a double prime symbol (").

As with the carrier mountings illustrated in FIGS. 1 to 7, each primary carrier mounting 3" comprises a plastics socket member 15" having two sockets 17", 19" provided therein, said sockets 17", 19" each being configured to receive a correspondingly shaped strut of an infant seat (not shown) to secure it in place on the pushchair chassis 7". The sockets 17", 19" each comprise an opening leading to a longitudinal bore extending into the socket member 15". The sockets 17", 19" are diametrically opposed to one another on the carrier mounting 3", and the bores of the sockets 17", 19" meet inside the socket member 15" to define a single cavity within.

The socket member 15" is pivotally mounted on the pushchair chassis 7" and can be pivoted about an angle of approximately 180° to enable positioning of the socket member 15" between first and second positions (shown in FIGS. 10 and 11 respectively). The directions of pivotal movement are shown in both FIG. 10 and FIG. 11. The sockets 17", 19" are disposed on the socket member 15" such that, upon pivotal movement between said first and second positions, the longitudinal axis of the bore of one or the other of the sockets 17", 19" points substantially vertically upwards, while the other socket 17", 19" points substantially vertically downwards. In this way, when the strut of the infant seat (not shown) is received in the upwardly pointing socket 17", 19", the infant seat is supported in an upright position.

In the socket member 15" first position as shown in FIG. 10, the bore of a first socket 17" is in a receiving position in which the longitudinal axis of the bore points substantially vertically upwards, while the bore of the second socket 19" points substantially vertically downwards. FIG. 11 shows the socket member 15" in a second position in which a second socket 19" is in the receiving position, once again in which the longitudinal axis of the bore points substantially vertically upwards, while the bore of the first socket 17" points substantially vertically downwards.

The utility of pivoting the mounting 3" between first and second positions is substantially the same as that of the embodiments of carrier mounting illustrated in FIGS. 1 to 7 and described in the associated description above.

The primary carrier mounting 3" further comprises a releasable locking mechanism 23" configured to hold the socket member 15" in each of the first and second positions, and to allow pivoting therebetween. A push-button 24" is associated with the locking mechanism 23" to enable release thereof, the button 24" being biased towards an engaged position in which the mechanism 23" is held in place, thereby preventing pivoting movement of the socket member 15". Actuation, e.g. pressing, of the button 24" disengages the locking mechanism 23" to enable pivoting of the carrier mounting 3".

The invention claimed is:

1. A carrier mounting for supporting an infant carrier on a pushchair chassis, the mounting comprising a socket member having a first socket and a second socket therein, both sockets being configured to receive a correspondingly shaped mounting strut of an infant carrier,
   wherein said socket member is pivotable between first and second positions such that when the carrier mounting is connected to a pushchair chassis, the first or second socket respectively is locatable in a receiving position in which a longitudinal axis of the respective socket bore is oriented with respect to the pushchair chassis at an angle suitable for receiving a mounting strut of an infant carrier,
   wherein when the second socket is in its receiving position, said second socket is vertically elevated with respect to the pushchair chassis as compared to the first socket in its receiving position, such that said second socket supports the infant carrier at a higher point on the pushchair chassis than the first socket, and
   wherein the carrier mounting further comprises a locking mechanism configured to releasably hold the socket member in each of the first and second positions, and to allow pivoting therebetween.

2. The carrier mounting according to claim 1, wherein the angle of the respective socket bore extends substantially vertically upwards with respect to the pushchair chassis when the respective socket is in its receiving position.

3. The carrier mounting according to claim 2, wherein the bores of the first and second sockets meet inside the socket member to define a common cavity.

4. The carrier mounting according to claim 1, wherein the socket member is pivotable about an angle of about 135° to effect movement between said first and second positions.

5. The carrier mounting according to claims 1, wherein the socket member is pivotable about an angle of about 180° to effect movement between said first and second positions.

6. A pushchair chassis comprising two carrier mountings according to claim 1.

7. The pushchair chassis according to claim 6, further comprising additional carrier mountings for receiving an additional infant carrier thereon.

8. The pushchair chassis according to claim 7, wherein the chassis comprises a frame, with the two carrier mountings being provided on the frame and the additional carrier mountings provided either below or above the said carrier mountings.

9. The pushchair chassis according to claim 8, wherein the chassis is configured to receive the infant carriers in an in-line fashion.

10. The pushchair chassis according to claim 7, wherein the chassis is configured to receive the infant carriers in an in-line fashion.

11. A pushchair comprising two carrier mountings according to claim 1, and at least one infant carrier.

12. The pushchair according to claim 11, further comprising additional carrier mountings for receiving an additional infant carrier thereon.

13. The pushchair according to claim 12, wherein the pushchair comprises a frame, with the two carrier mountings being provided on the frame and the additional carrier mountings being provided either below or above the said carrier mountings.

14. The pushchair according to claim 13, wherein the pushchair is configured to receive the infant carriers in an in-line fashion.

15. The pushchair according to claim 14, comprising two infant carriers.

16. The pushchair according to claim 13, comprising two infant carriers.

17. The pushchair according to claim 12, comprising two infant carriers.

18. The pushchair according to claim 12, wherein the pushchair is configured to receive the infant carriers in an in-line fashion.

19. The pushchair according to claim 18, comprising two infant carriers.

* * * * *